United States Patent Office 3,050,483
Patented Aug. 21, 1962

3,050,483
ASPHALT-CHLORINATED POLYETHYLENE COMPOSITION FOR ROAD-MAKING
James Kalil, Wilmington, Del., assignor to E. I. du Pont de Nemours and Company, Wilmington, Del., a corporation of Delaware
No Drawing. Filed Jan. 25, 1960, Ser. No. 4,238
2 Claims. (Cl. 260—28.5)

This invention is directed to bituminous materials and more particularly to a process for improving asphalt to be used for road-making and similar purposes.

It is known that small proportions of many elastomers, particularly certain polychloroprenes, remarkably improve asphalts in those properties which are related to their performance in road-making. Even though less than 5% and often less than 2% of the elastomer is used, this addition adds considerably to the cost of the treated asphalt, although of course it is justified by the improvement of properties. Hence the search has continued for more economical treatments giving the same advantages.

It has been discovered that chlorinated polyethylene greatly improves the properties of asphalt.

It is an object of the present invention to provide a novel bituminous composition having unexpected and significant physical properties. It is a further object of this invention to provide an improved asphalt having significant utility in road-making, said asphalt being unexpectedly modified by the use of chlorinated polyethylene as hereinafter more specifically described.

These and other objects will become apparent in the following description and claims.

More specifically, the present invention is directed to asphalt of improved properties, said asphalt containing 0.5 to 5.0% of a normally solid polyethylene, chlorinated to the extent of 15 to 35%, dispersed in said asphalt.

Representative examples illustrating the present invention follow.

EXAMPLE 1

The chlorinated polyethylene used is made from a linear polyethylene of density 0.960 and melt index 6. This is chlorinated in carbon tetrachloride solution with gaseous chlorine, using alpha, alpha'-azobis isobutyronitrile as catalyst, as described in U.S. 2,503,252. When the desired degree of chlorination is reached, the remaining hydrogen chloride is boiled out and the chlorinated polyethylene is isolated from the carbon tetrachloride solution by introducing it continuously into the nip of two rotating drums internally heated to about 150° C., to boil off the solvent, and removing from the drums the sheets of dry chlorinated polyethylene thus formed, as described in British Patent 804,535. The product contains 28.2% chlorine. It is prepared for incorporation into asphalt by grinding to a powder in the presence of solid carbon dioxide, using a finely divided clay to prevent agglomeration.

Asphalt of 85–100 penetration grade is heated at 150° C. and 1.5% of the powdered chlorinated polyethylene is incorporated with stirring during 30 minutes. The resulting modified asphalt is tested as shown in Table I which follows.

EXAMPLE 2

The chlorinated polyethylene used here is made from a branched polyethylene of density 0.919 and melt index 10, made at high pressure. The chlorination and isolation are carried out as in Example 1 and the product contains 30.4% chlorine. It is powdered and incorporated in asphalt as in Example 1. The test results are shown in Table I.

Table II gives for comparison the performance of a chlorosulfonated polyethylene (29% chlorine and 1.5% sulfur), polyvinyl chloride, and polyethylene, in asphalt.

The tests used for examining the dispersions of chlorinated polyethylenes in asphalt, and other asphalt compositions used for comparison, are partly those which are standard in the industry and partly specifically designed to bring out the special properties resulting when small proportions of elastomers are incorporated into the asphalt. The tests used are as follows:

*Penetration, ASTM D5–52.*—The depth of penetration of a needle under constant load into the sample at a given constant temperature. The higher values indicate a softer compound.

*Stress/strain.*—Several quantities are determined from a graph (automatically recorded) showing the relation between applied load and elongation when a hemisphere of 7/16 inch radius, embedded in a mass of asphalt, is pulled out at a constant rate of 12 inches per minute. The load first increases rapidly to a peak and then falls again, as the sample forms a rope between the hemisphere and the body of the asphalt. At this stage, great differences appear between the untreated asphalt and asphalt containing various elastomers. With asphalt itself, the rope shows little resistance to further stretching and the load rapidly falls to zero, as the rope becomes a fine string.

Using the terminology suggested by Benson in "Roads and Streets," April 1955, the entire work (in inch lbs.) done upon the samples prepared for the stress/strain determination is the toughness; the tenacity is the work (in inch lbs.) done after the samples begin to resist further elongation.

*Ductility, ASTM D113–44.* — A dumbbell-shaped sample (standard specification) of asphalt is cast in a brass mold, cooled and conditioned at the testing temperature. Tests are run at 77° F. and 39.2° F. by pulling the ends of the dumbbell apart horizontally in a water bath at a constant rate. Ductility is recorded as the distance (in centimeters) over which the sample is pulled before breaking at the neck of the dumbbell. The rate of pulling is 5 cm./minute.

*Torsional recovery.* — The torsional recovery test measures the elasticity imparted to a bituminous material by an elastomer. A bolt and disc assembly is supported in a 3-ounce seamless ointment can. The melted asphalt sample is poured into the can until it was flush with the surface of the disc. The assembly is then conditioned at 77° F. for a minimum of 2 hours before testing. By means of wrench and locked nuts on the bolt, the disc is rotated at a steady rate through an arc of 180° relative to the sample container and released immediately. The angle of the recovery is measured after 30 seconds and 30 minutes and values of percent of recovery are recorded.

*Table I*

CHLORINATED POLYETHYLENES IN ASPHALT

|  | Control | Ex. 1 | Ex. 2 |
|---|---|---|---|
| Penetration, 77° F./100 gm./5 sec | 79 | 87 | 88 |
| Ductility, 39.2° F. (5 cm./min.) | 8.5 | 16 | 17 |
| Tenacity, in.-lbs | 7 | 30 | 25 |
| Toughness, in.-lbs | 28 | 51 | 45 |
| Tenacity, in.-lbs. aged 3 days at 300° F | 3 | 91 | 37 |
| Toughness, in.-lbs. aged 3 days at 300° F | 28 | 120 | 62 |
| Torsional recovery percent, 30 sec | 3.3 | 11.8 | 13.0 |
| Torsional recovery percent, 30 min | 3.6 | 17.8 | 14.2 |

Table II
CHLOROSULFONATED POLYETHYLENE AND RELATED POLYMERS IN ASPHALT

|  | Control | Chlorosulfonated Polyethylene | Control | Polyvinyl Chloride | Polyethylene |
|---|---|---|---|---|---|
| Tenacity, in.-lbs | 4.2 | 3.0 | 4.8 | 0.6 | 3.0 |
| Toughness, in.-lbs | 23.4 | 18.6 | 19.2 | 9.0 | 16.8 |
| Torsional Recovery, Percent 30 sec |  |  | 2.8 | 2.8 | 2.8 |
| Torsional Recovery, Percent 30 min |  |  | 4.4 | 4.4 | 4.4 |
| Penetration, 77° F./100 gm./5 sec | 91 | 51 |  |  |  |

The polyethylene chlorinated to form the asphalt additive of the present invention should be normally solid, that is, should be a solid at temperatures below about 50° C. Preferably, it should have a melt index (ASTM–D–1238–52T) between 0.5 and 50. It may be made by any of the available methods for polymerizing ethylene, either high pressure or low pressure, and may be either linear or branched. The chlorine content is critical, products containing less than 15 or more than 35% having little beneficial effect upon asphalt and approaching the behavior of polyethylene on the one hand and polyvinyl chloride on the other. See Table II. Note that polyvinyl chloride has the composition of a polyethylene chlorinated to the extent of 57%. The preferred chlorine content is 20 to 32%.

The chlorinated polyethylene is incorporated, according to the present invention, into the asphalt by having the former in finely divided form (smaller than 10 mesh) and the latter in liquid form, either molten (preferably at 100 to 180° C.) or dissolved in a solvent ("cut back"), or in aqueous dispersion. The chlorinated polyethylene may be first dispersed in water or other volatile non-solvent for the chlorinated polyethylene and asphalt.

The amount of chlorinated polyethylene incorporated is usually between 0.5 and 5.0% of the asphalt. The preferred amount is 1–3%. Smaller amounts ordinarily do not produce effects of practical significance, while amounts above 5% are difficult to disperse satisfactorily. The invention is applicable to all types of asphalt, either naturally occurring or derived from crude oils of various sources.

Any of the described chlorinated polyethylenes may be substituted in the preceding examples, within the designated concentration range, to give substantially the same results in all types of asphalt.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Asphalt containing dispersed therein from 0.5 to 5.0% by weight of said asphalt of a normally solid polyethylene, said polyethylene being chlorinated to the extent of from about 15 to 35% by weight thereof.

2. A process for preparing asphalt road-making compositions in which process from 0.5 to 5.0% by weight of said asphalt of a normally solid polyethylene, said polyethylene being chlorinated to the extent of 15 to 35% by weight thereof, is dispersed in said asphalt.

References Cited in the file of this patent

UNITED STATES PATENTS

| 2,298,833 | Muessig | Oct. 13, 1942 |
| 2,871,212 | Thayer | Jan. 27, 1959 |
| 2,918,940 | Carr | Dec. 29, 1959 |
| 2,930,726 | Jones et al. | Mar. 29, 1960 |

Notice of Adverse Decision in Interference

In Interference No. 95,123 involving Patent No. 3,050,483, J. Kalil, ASPHALT-CHLORINATED POLYETHYLENE COMPOSITION FOR ROAD-MAKING, final judgment adverse to the patentee was rendered Aug. 30, 1966, as to claims 1 and 2.

[*Official Gazette October 25, 1966.*]